United States Patent

[11] 3,603,995

[72] Inventor Dean D. Howard
 Oxon Hill, Md.
[21] Appl. No. 885,573
[22] Filed Dec. 16, 1969
[45] Patented Sept. 7, 1971
[73] Assignee The United States of America as
 represented by the Secretary of the Navy
 Continuation-in-part of application Ser. No.
 785,882, Dec. 23, 1968, now Patent No.
 3,487,406.

[54] SIGNAL PROCESSOR FOR DIVERSITY
 FREQUENCY RADAR
 7 Claims, 2 Drawing Figs.
[52] U.S. Cl.................................................. 343/7.3,
 343/7.4, 343/17.2 R
[51] Int. Cl................................................... G01s 9/16
[50] Field of Search..................................... 343/7.3,
 7.4, 17.2 R

[56] References Cited
UNITED STATES PATENTS
3,184,741 5/1965 Buck............................ 343/1.72 R X
3,383,686 5/1968 Davis et al.................... 343/17.2 R X Primary Examiner—T. H. Tubbesing
Attorneys—R. S. Sciascia, Arthur L. Branning and J. G. Murray ABSTRACT: A pulse-to-pulse frequency diversity tracking radar wherein target angle scintillation is minimized by using only the frequencies giving the strongest echoes for tracking.

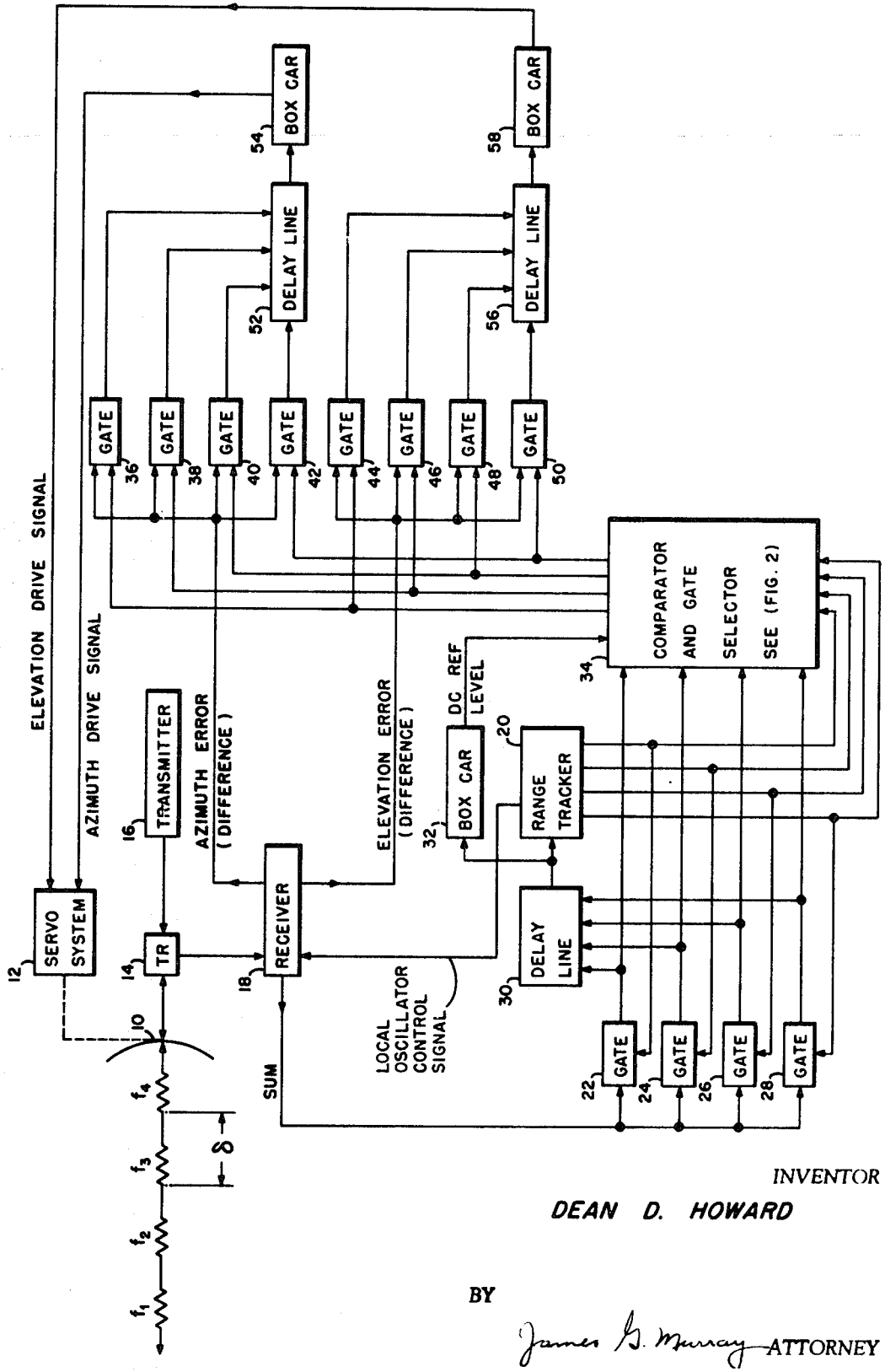

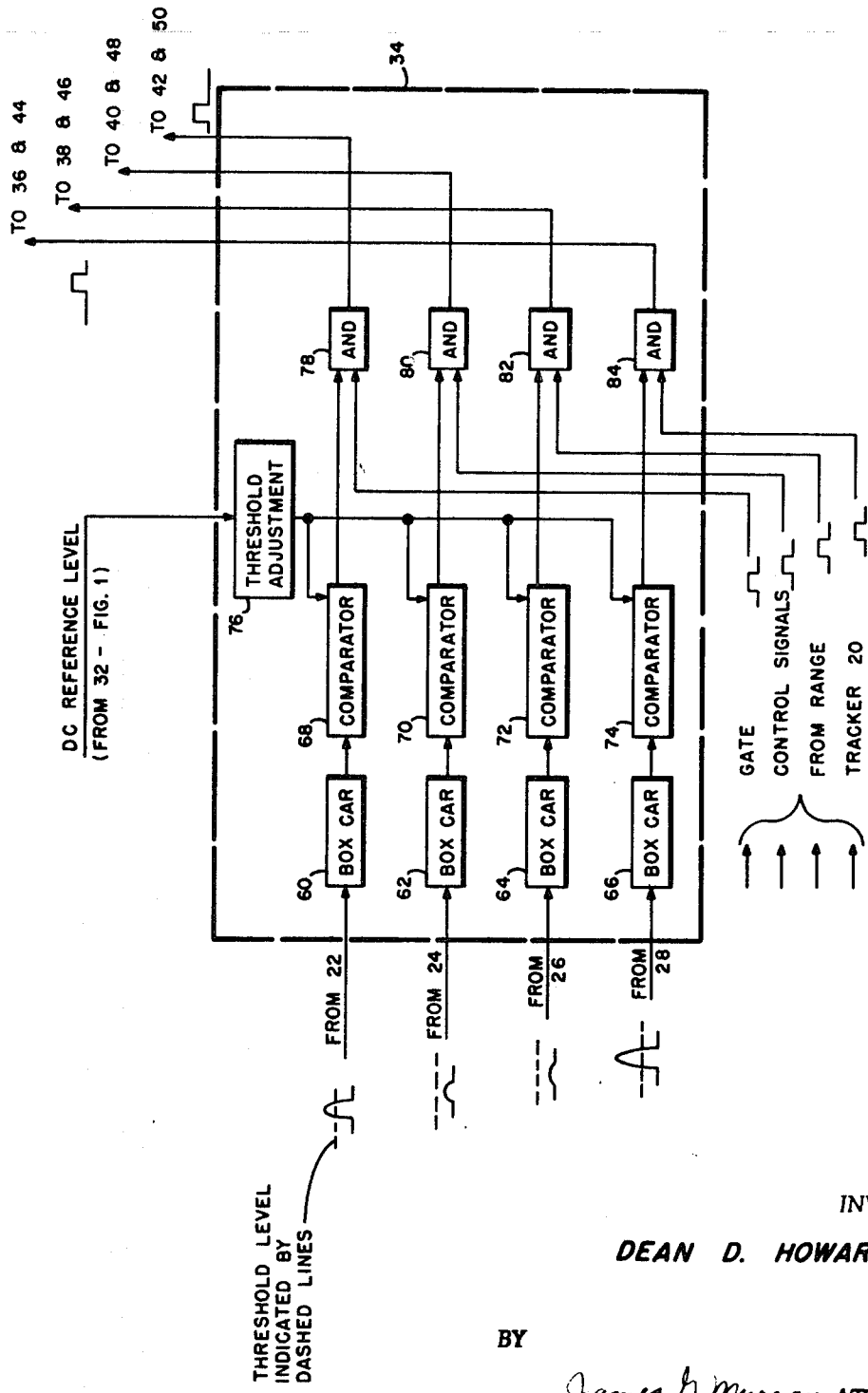

SIGNAL PROCESSOR FOR DIVERSITY FREQUENCY RADAR

CROSS REFERENCE TO RELATED APPLICATION

This application is a continuation-in-part of application Ser. No. 785,882 filed on Dec. 23, 1968 by Dean D. Howard for "Signal Processor For Diversity Frequency Radar," now U.S. Pat. No. 3,487,406.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Pulse-to-pulse frequency diversity radar techniques, i.e. techniques by which the RF of each radar transmitted pulse is different from the preceding pulse, are widely known and have been practiced largely with high powered search radar to extend the unambigious range. Such techniques have not, until very recently, been extensively used in tracking radar.

Target angle scintillation is a basic limitation to the accuracy of tracking radars and occurs because the many reflecting surfaces of a typical target, such as an aircraft, do not reflect a perfectly plane wave but instead produce warped wave echoes which are interpreted by the radar receiver as a wander, as a function of time, of the apparent position of the target. This wander is so slow that conventional integration or averaging techniques do not significantly reduce the scintillation error.

Recently, efforts have been made to utilize the pulse-to-pulse frequency diversity techniques to reduce target angle scintillation in tracking radar since it has been found that different target wander occurs with different RF. These prior efforts have concentrated on averaging the position of the target as indicated by the various different frequencies used in the pulse-to-pulse frequency diversity and have significantly reduced the effects of target angle scintillation.

SUMMARY OF THE INVENTION

The invention described herein, and the invention disclosed in the previously mentioned prior application, employ a different approach from the prior used averaging technique described above. This novel, different approach is based on the finding that larger angle scintillation errors occur during the time when the echo signal amplitude fades or drops in level and that the smaller errors occur when the echo amplitude is largest. The invention described in the prior application provided for the comparison of the returns of the various frequencies used in the pulse-to-pulse frequency diversity and for the selection and the use for tracking purposes of the frequency giving the strongest echo. This prior invention has the inherent disadvantage that all but the strongest echo is discarded, even though some of the discarded echoes were almost as strong as the echoes used for tracking. The present invention is an improvement over the invention described in the prior application and provides for the retention and use of not only the strongest echo but also of the other strong echoes which are above a threshold determined by the strength of all of the return signals. In other words, this invention provides for using more of the return signals and thereby obtaining more accurate tracking.

OBJECTS OF THE INVENTION

It is, therefore, an object of this invention to provide an improved tracking radar.

A further object is to provide an improved tracking radar wherein target angle scintillation is minimized.

Yet another object of the present invention is the provision of an improved tracking radar using pulse-to-pulse frequency diversity to minimize the inaccuracies caused by target wander.

A still further object is to provide an improved tracking radar wherein pulse-to-pulse frequency diversity is used to minimize target angle scintillation by selecting and using for tracking those frequencies which cause echoes that are stronger than some threshold which is determined from the average strength of all of the echoes.

DESCRIPTION OF THE DRAWINGS

Other objects and many of the attendant advantages of this invention will be readily appreciated as the same becomes better understood by reference to the following detailed description of a preferred embodiment of the invention when considered in connection with the accompanying drawings in which like reference numerals designate like parts throughout the Figures thereof and wherein:

FIG 1 illustrates a preferred embodiment of the invention in block diagram form and FIG. 2 shows details of the comparator and gate selector of FIG. 1.

DESCRIPTION OF THE PREFERRED EMBODIMENT

Referring now to FIG. 1, wherein a preferred embodiment of the invention is illustrated in block diagram form, there is shown a tracking radar which includes antenna 10 that is positioned in elevation and azimuth by a servo drive system 12. Antenna 10 is connected in a conventional manner through TR device 14 to a transmitter 16 and a receiver 18. As shown, for each PRF interval the signal transmitted and the echoes received by antenna 10 comprises a burst of four different frequency pulses $f_1, f_2, f_3$, and $f_4$. These pulses are spaced at intervals of $\delta$.

The receiver 18 is of the three-channel type conventionally used in monopulse tracking radar except, of course, that the local oscillator must be frequency stepped so that the received RF pulse pattern $f_1, f_2, f_3$, and $f_4$ is reduced to a common IF. As described in more detail in many reference books, such as Chapter 5 in "Introduction to Radar Systems" by Merrill I. Skolnik, three channel receivers produce three video output signals, two bipolar difference signals which are representative of azimuth and elevation error and a sum signal which is used for range determination.

As shown in FIG. 1, the range tracking unit 20, upon locating and locking on a target, controls the receiver local oscillator and gates 22, 24, 26 and 28 so that the receiver video sum signal resulting from pulse $f_1$ passes through gate 22, the signal resulting from pulse $f_2$ passes through gate 24, etc. After passing through the gates 22, 24, 26 and 28, the video sum signals are connected to tapped delay line 30 in such a way as to simultaneously arrive at the delay line output, i.e. in a PRF interval the output of delay line 30 is a single pulse which is the sum of the pulses which pass through the gates 22, 24, 26 and 28.

The pulsed output of delay line 30 is connected to control the range tracker 20 and to boxcar circuit 32 which is in turn connected to the comparator and gate selector 34 and which provides thereto a DC reference (Threshold) level signal that is proportional to the output of delay line 30.

The unit 34 is shown in more detail in FIG. 2, which will subsequently be more fully described. For the present, however, it is sufficient merely to functionally describe the operation of unit 34. In this unit the individual outputs of gates 22, 24, 26 and 28 are compared with a predetermined fraction of the DC reference level signal from boxcar 32. This predetermined fraction, or threshold level, is a matter of experimental, operational and design choice and typically would be set at a level slightly below the average voltage value of the outputs of gates 22, 24, 26 and 28.

For those gates 22, 24, 26 and 28 which have an output exceeding the threshold level, the unit 34 produces signals which open analogous ones of the gates 36, 38, 40 and 42, which are also connected to receive the azimuth error signal from receiver 18, and of the gates 44, 46, 48 and 50, which are also connected to receive the elevation error signal from receiver 18. In other words, if the outputs of gates 22 and 28 (which the reader will recall are opened to pass the receiver video sum signal resulting from the $f_1$ and $f_4$ pulses) exceed the threshold level, the unit 34 produces signals to open gates 42 and 50 to respectively pass the $f_1$ pulse returns in the azimuth and elevation error signals, and to open gates 36 and 44 to respectively pass the $f_4$ pulse returns in the azimuth and elevation error signals. Gates 36, 38, 40 and 42 are connected to delay line 52 in such a way as to simultaneously arrive at the delay line output which is connected through boxcar circuit 54 to control the azimuth drive of servosystem 12. Similarly the gates 44, 46, 48 and 50 are connected to delay line 56 in such a way as to simultaneously arrive at the delay line output which is connected through boxcar circuit 58 to control the elevation drive of servosystem 12.

Referring now to FIG. 2 which illustrates the comparator and gate selector unit in more detail. As shown, the output leads from gates 22, 24, 26 and 28 (FIG. 1) are connected through boxcar circuits 60, 62, 64 and 66 to comparator circuits 68, 70, 72 and 74 which compare the amplitude outputs of gates 22, 24, 26 and 28 with the DC reference level signal from boxcar 32 (FIG. 1) as adjusted by the threshold adjustment circuit 76 which is typically a voltage divider.

Those outputs of boxcar circuits 60, 62, 64 and 66 which exceed the threshold signal output of circuit 76 cause the associated comparator circuits 68, 70, 72 and 74 to produce signals which are passed by electronic switches (typically AND gates) 78, 80, 82 and 84 that are also connected to receive the control signals from range tracker 20 (which also control gates 22, 24, 26 and 28). The outputs of the switches 78, 80, 82 and 84 are connected, as shown, to control the gates 36, 38, 40, 42, 44, 46, 48 and 50 (FIG. 1).

The operation of the preferred embodiment of FIGS. 1 and 2 will now be described. Transmitter 16, TR device 14, antenna 10 and receiver 18 cooperate in a conventional manner during each PRF period to radiate and receive pulses $f_1, f_2, f_3,$ and $f_4$ which are sufficiently frequency diverse so that different target scintillation or wander patterns occur. The receiver sum signals for these pulses are combined in the delay line 30 and are used to control the range tracker 20 which, in turn, functions to control the local oscillator in receiver 18 and to produce four time spaced pulses that control gates 22, 24, 26 and 28 to separate and apply the video sum signal to unit 34. The combined pulse output of delay 30, after processing by boxcar circuit 32 and threshold adjustment 76, is compared in unit 34 with the video sum signals and, when the sum signal exceeds the threshold, appropriate ones of the time spaced pulses from range tracker 20 are passed to open appropriate ones of the gates 36, 38, 40, 42, 44, 46, 48 and 50. Opening of these gates, at the correct time, passes the bipolar azimuth and elevation error difference signals from receiver 18 that relate to the pulses $f_1, f_2, f_3,$ and $f_4$ which produced video sum signals stronger than the threshold signal from unit 76. The passed azimuth and elevation error pulse signals are combined in delay lines 52 and 56 and these bipolar signals are then used to control the azimuth and elevation drives of the servosystem 12 to accurately position antenna 10 for a minimum target scintillation error.

As illustrated the $f_1$ and $f_4$ pulses exceed the threshold signal. Accordingly comparator 68, and AND gate 78 cooperate to open gates 42 and 50 and comparator 74 and AND gate 84 cooperate to open gates 36 and 44.

Obviously many modifications and variations of the present invention are possible in the light of the above teachings. While the preferred embodiment shown in FIGS. 1 and 2 illustrate a conventional three-channel monopulse radar with frequency diversity arranged to switch frequency from one pulse to the next, this illustration should not be interpreted as precluding an implementation with other pulsing arrangements and other types of tracking radars such as two-channel monopulse, conical scan and other methods or as precluding operation with a radar that scans frequency continuously within a pulse. Also, it is contemplated that the invention could be used with coherent pulse compression systems. It is therefore to be understood, that within the scope of the appended claims, the invention may be practiced otherwise than as specifically described.

What is claimed and desired to be secured by Letters Patent of the United States is:

1. The method of tracking an object by radar with a minimum of target scintillation by causing said radar to perform the steps of:
    repetitively radiating a plurality of electromagnetic pulses which are different in frequency according to a predetermined sequence;
    receiving echoes of said pulses from said object;
    producing a threshold signal which is a predetermined function of the average of said received echoes;
    comparing said received echoes and determining which frequency pulses produced echoes stronger than said threshold signal and
    using said pulses which produced echoes stronger than said threshold signal to track said object
    whereby said object is tracked with a minimum of target scintillation.

2. Radar apparatus for tracking an object with a minimum of target scintillation comprising:
    transmitting means which repetitively radiate a plurality of electromagnetic pulses that are different in frequency according to a predetermined sequence;
    receiving means which receive echoes of said pulses from said object;
    a positionable antenna which is connected to and which intermittently and alternately functions as part of said transmitting means and as part of said receiving means;
    servo drive means connected to said positionable antenna and which functions to mechanically point said antenna at said object and
    comparing and selecting means connected to said receiving means and to said servo drive means and functioning to determine which frequency pulses produced echoes stronger than a threshold level and to apply only said stronger echoes to energize said servo drive means
    whereby said object is tracked with a minimum of target scintillation.

3. The radar apparatus of claim 2 wherein said comparing and selecting means includes threshold level signal producing means which function to produce a threshold level signal that is a predetermined function of the average of said received echoes.

4. Radar apparatus for tracking an object with a minimum of target scintillation comprising:
    transmitting means which repetitively produce and radiate a plurality of electromagnetic pulses that are different in frequency according to a predetermined sequence;
    receiving means which receive echoes of said pulses from said object and which produce first, second and third signals from each received echo;
    a positionable antenna which is connected to and which intermittently and alternately functions as part of said transmitting means and as part of said receiving means;
    servo drive means connected to said positionable antenna and which functions to mechanically point said antenna at said object;
    gating means which intermittently connect said second and third receiver signals to energize said servo drive means and
    comparing and selecting means connected to receive said first receiver signal and functioning to determine which frequency pulse echo produces first signals that are stronger than a threshold level and functioning to control said gating means so that said servo drive means is energized only by said second and third receiver signals that result from the frequency pulse echoes that produce first signals that are stronger than said threshold level whereby said object is tracked with a minimum of target scintillation.

5. The radar apparatus of claim 4 wherein said comparing and selecting means includes threshold level signal producing means which function to produce a threshold level signal that is a predetermined function of the average of said first signals.

6. The radar apparatus of claim 5 and further including:

a delay line connected to receive said first signals in such a way that the output signal of said delay line is related to the strength of said first signal for the whole of said predetermined electromagnetic pulse frequency sequence and range tracking means connected to said delay line and functioning to produce control signals for said receiving means and for said comparing and selecting means.

7. The radar apparatus of claim 6 wherein said comparing and selecting means includes:

connecting means connecting said threshold level signal producing means to said delay line output signal and comparator means connected to receive said first signals and said threshold level signal and functioning to produce gating signals which control said gating means to pass said second and third receiver signals only when said first signals are stronger than said threshold level signal.